Sept. 8, 1931. P. E. MATTHEWS 1,822,160
CLUTCH BRAKE
Filed Nov. 14, 1929
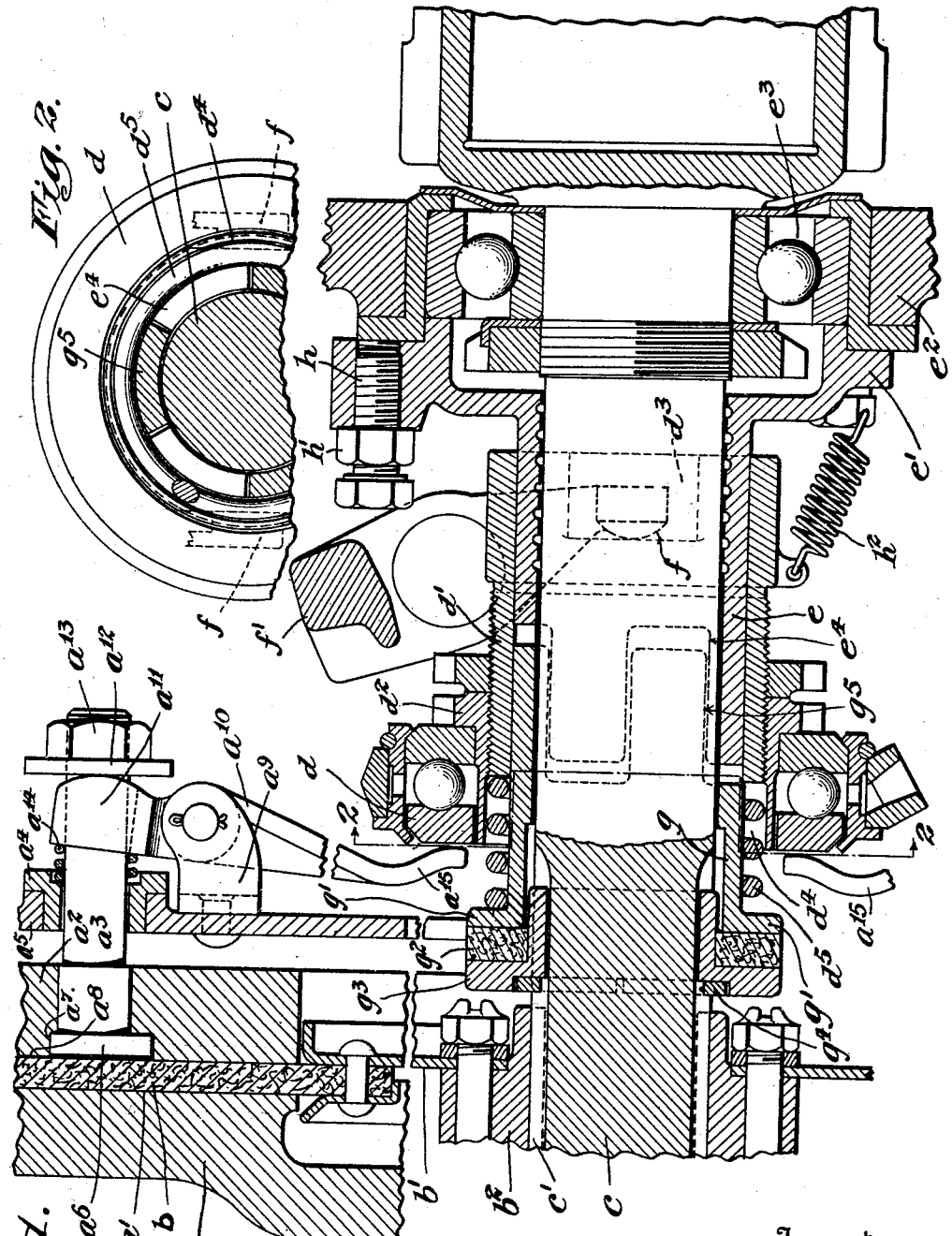

Patented Sept. 8, 1931

1,822,160

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

CLUTCH BRAKE

Application filed November 14, 1929. Serial No. 407,056.

The present invention relates to clutch mechanisms and embodies, more specifically, an improved clutch construction in which a clutch brake is incorporated to stop the rotation of one of the rotating elements of the clutch when the clutch is disengaged.

In the push type clutches, the provision of a clutch brake requires the use of elements which are comparatively difficult to assemble by reason of the fact that the brake elements must be included between the clutch yoke and the clutch in order that they may function properly. Furthermore, in connection with clutch brakes of this character, considerable strain is frequently impressed upon the brake elements by the unskillful operation of the average driver. By reason of the fact that the pressure exerted upon the foot pedal is directly impressed upon the brake elements, depressing the foot pedal beyond a predetermined amount will impose serious strains upon the brake. These strains occur when the brake elements have been moved into such position that there no longer is exerted a yielding or cushioning force between them but only the positive force applied by the clutch pedal.

It is therefore an object of this invention to provide a simple and effective brake mechanism to be incorporated in a clutch structure of such character that the parts are easily manufactured and readily assembled.

A further object of the invention is to provide a clutch brake of the above character in which the parts function effectively and require but little supervision.

A further object of the invention is to provide a clutch brake mechanism for a push type of clutch, means being provided to prevent excessive strains from being impressed upon the mechanism by the driver of the vehicle.

The above objects are attained, in the mechanism shown herein, by the provision of brake elements to be described hereinafter more specifically and a positive adjustable stop against which the clutch operating yoke abuts upon a predetermined maximum movement thereof in a clutch releasing direction.

Further objects, not specifically enumerated above, will be apparent as the invention is described in greater detail in connection with the accompanying drawings, wherein:

Figure 1 is a view in vertical section, taken through the axis of a clutch constructed in accordance with the present invention and showing the brake elements and operating mechanism therefor.

Figure 2 is a view in section, taken on line 2—2 of Figure 1, and looking in the direction of the arrows.

Referring to the above drawings, $a$ designates a clutch driving member having an engaging face $a'$. A cooperating engaging member $a^2$ is provided, this member being carried upon a plurality of pins $a^3$ which are mounted in suitable bushings $a^4$, carried in a housing member $a^5$. The pins are provided with flanged heads $a^6$ which are received within recesses $a^7$ spaced as desired about the engaging surface $a^8$ of the operating member $a^2$.

A suitable friction disc $b$ is carried between the members $a$ and $a^2$ upon a spider $b'$, this spider being secured to a hub $b^2$ which is slidably mounted upon a driven shaft $c$ by means of splines $c'$. In this manner, the hub $b^2$ may partake of axial movement with respect to the shaft $c$ without rotating with respect thereto.

Suitable lugs $a^9$ are spaced about the outer portion of the housing $a^5$ and pivotally carry operating arms $a^{10}$. These arms are formed with yoke shaped extremities $a^{11}$ which engage a flange $a^{12}$, secured upon pin $a^3$ by means of nut $a^{13}$ and, in this manner, operate clutch member $a^2$ in a desired manner. A spring $a^{14}$ normally urges the yoke shaped extremity $a^{11}$ outwardly to separate the clutch members $a$ and $a^2$. The inner extremity $a^{15}$ of each arm $a^{10}$ is engaged by a thrust member $d$, this member being carried upon a sleeve $d'$ and secured thereto by means of a collar $d^2$. Sleeve $d'$ is slidably mounted upon a steering sleeve $e$, formed upon closure member $e'$ which is secured to a steering supporting element $e^2$. The shaft $c$ may be journaled at $e^3$ in the steering member $e^2$ in a well known manner. Again reverting to the slidable sleeve $d'$, spaced recesses $d^3$ are formed upon opposite sides thereof to be engaged by fingers $f$ of the clutch operating yoke $f'$. A recess $d^4$ is further provided at the extremity of the slidable sleeve $d'$, under the collar $d^2$. A brake operating spring $d^5$ is seated within this recess for thrusting a slidable sleeve $g$, outwardly, as clearly seen in Figure 1. The sleeve $g$ is formed with a flanged extremity $g'$ and engages a friction disc $g^2$ which is carried by a collar $g^3$, secured to the pinion shaft $c$ by means of a lock washer $g^4$. It will thus be seen that the rotation of pinion shaft $c$ will be transmitted to the flanged collar $g^3$ and, upon movement of engaging flange $g'$ against the friction disc $g^2$ and flanged collar $g^3$, the force exerted by spring $d^5$ will exert a drag upon the pinion shaft sufficient to stop rotation thereof. Interengaging extensions $g^5$ and $e^4$ on the respective sleeves $g$ and $e$ prevent rotation of the sliding sleeve $g$ in a manner which will be readily apparent.

Upon the closure member $e'$, a stop pin $h$ is secured, an adjusting nut $h'$ enabling the pin to be locked securely in a desired position. Upon a predetermined maximum, desirable movement of the clutch operating mechanism, the yoke member $f'$ engages the pin $h$ and further movement of the former is prevented. This positive stop prevents the spring $d^5$ from being compressed until it becomes a solid column, at which time the entire force exerted upon the clutch lever would be applied directly to the clutch brake elements, resulting in serious damage thereto. A retractile spring $h^2$ is secured between the sleeve $d'$ and closure member $e'$ to urge the former normally in the position shown in Figure 1, which is the normal engaging position of the clutch. At this time, the brake elements are not in engagement and the clutch is transmitting the drive to the pinion shaft $c$ in the usual fashion.

While the invention has been described with specific reference to the accompanying drawings, it is not to be limited, save as defined in the appended claim.

I claim as my invention:

In a clutch brake construction, a rotating clutch element, a shaft mounting the same, a stationary element mounting the shaft, a sleeve formed on the stationary element, a second sleeve slidable on the first sleeve, means to operate the clutch by the second sleeve, a braking element on the shaft between the second sleeve and clutch, a second braking element slidably mounted on the shaft, means to prevent rotation of the second element, a spring engaging the second element and abutting against the second sleeve normally tending to separate the first sleeve from the second braking element, and an adjustable stop pin carried by the stationary element to limit the movement of the second sleeve.

This specification signed this 6th day of Nov. A. D. 1929.

PHILIP E. MATTHEWS.